H. F. GELLERMAN.
VALVE GRINDING TOOL.
APPLICATION FILED AUG. 29, 1916.
1,307,296.
Patented June 17, 1919.
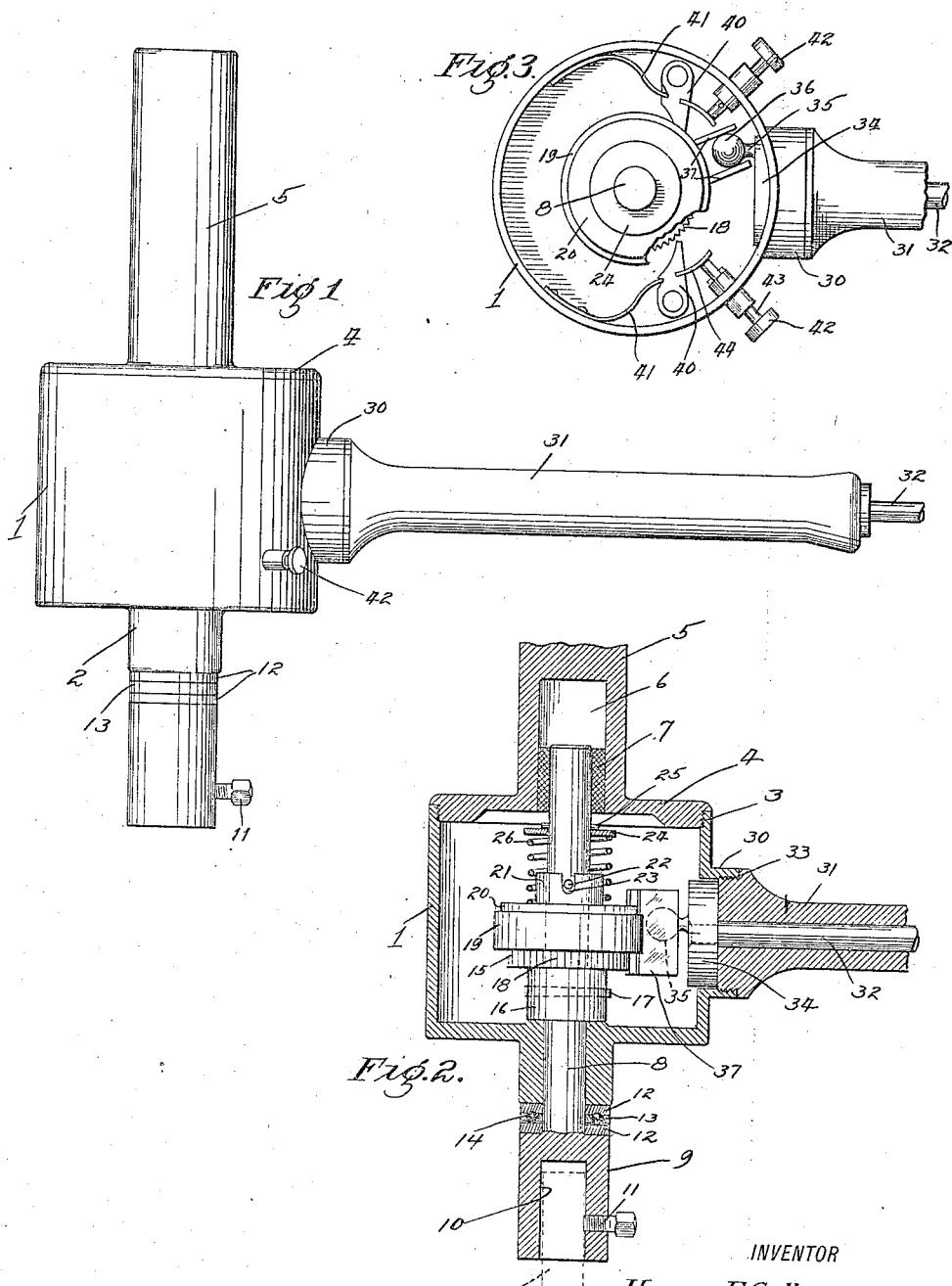
INVENTOR
Herman F. Gellerman
BY
H.C. Schroeder
ATTORNEY

UNITED STATES PATENT OFFICE.

HERMAN F. GELLERMAN, OF BERKELEY, CALIFORNIA.

VALVE-GRINDING TOOL.

1,307,296.  Specification of Letters Patent.  Patented June 17, 1919.

Application filed August 29, 1916. Serial No. 117,419.

*To all whom it may concern:*

Be it known that I, HERMAN F. GELLERMAN, citizen of the United States, residing at Berkeley, in the county of Alameda and State of California, have invented certain new and useful Improvements in Valve-Grinding Tools, of which the following is a specification.

This invention relates to improvements in grinding tools, more particularly to a device for grinding the valves of automobile engines.

The particular object of my invention is to provide an improved mechanical means for performing the work which is now done by hand, thereby greatly diminishing the time required for this operation.

My improved device is power driven and by its use a valve can be ground in two to five minutes, which formerly required from 15 minutes to a half hour.

Another object of my invention is to so construct the mechanism that the valve is oscillated a short distance and at suitable intervals the angle of oscillation is changed in position, thereby producing the most effective results.

Another object of my invention is to provide a device which is mechanically simple in construction, which contains few parts to become out of order and which is readily applied to the valve stem.

With these and other objects in view the invention consists in the novel construction in the combination and arrangement of parts herein illustrated, and more specifically pointed out in the appended claims.

Reference being had to the accompanying drawing:

Figure 1 is a side view of my improved grinding machine.

Fig. 2 is a view in vertical section showing in greater detail the operating mechanism.

Fig. 3 is a top plan view having the cover plate removed.

Referring to corresponding parts in the several views by the same numerals of reference, 1 denotes a cylindrical casing provided with the center boss 2 on the one end, the other end being open and provided with screw threads as shown at 3. 4 denotes a cover plate which is in threaded engagement with the casing and which is provided with a center stem 5. The lower part of this stem is hollow as shown at 6 and is provided with the bushing 7 which acts as a bearing for the operating shaft 8. This shaft is provided on the lower end with an enlarged socket 9 having a central opening 10 into which the valve stem 46 is adapted to be held by means of the set screw 11. This enlarged portion is of substantially the same diameter as the boss 2 and interposed therebetween is a thrust bearing comprising the ball races 12, between which are the balls 14 held in a suitable retaining ring 13.

The shaft 8 extends upwardly through the casing 1 and the top is journaled in the bearing 7. Within the casing a disk 15 having hub 16 is keyed to this shaft by means of a taper pin 17 and the outer periphery of the disk 15 is provided with ratchet teeth 18. Above this disk is an annular ring 19 which ring is oscillatively mounted on the shaft between disk 15 and disk 20. The latter has a hub 21 mounted on the shaft so as to rotate therewith, but has a slight longitudinal movement provided for by the pin 22, extending through shaft 8 and engaging slot 23 in the hub 21. Above this hub adjacent to plate 4 is a washer 24, held in fixed axial position by means of a pin 25 and interposed between the disk 20 and this washer is a compression spring 26.

On the outside of casing 1, is a radially disposed boss 30 to which is attached a handle 31. Extending through this handle and revolubly mounted therein is a shaft 32 to the outer end of which is attached a driving means such as a flexible shaft. The inner end of the handle is in screw threaded engagement with the boss 2, as shown by 33, and to the inner end of shaft 32 is attached a disk 34 from which extends a crank pin 35, this pin being provided with a spherical ball 36 on its outer end. Rigidly attached to the ring 19 are two plates 37, these plates being spaced a distance apart equal to the diameter of the ball 36. 40 are pawls pivotally mounted in the plane of disk 35 and arranged to contact with teeth 18. These pawls are normally held out of engagement with the teeth by means of the springs 41, but may be thrown into contact by means of operating buttons 42. These buttons are provided on the outer ends of rods 43 extending through the casing 1 and contacting on their inner ends with arms 44 formed on the side of pawls 40.

Having thus described the various features of my invention, its operation is as follows:

When the shaft 32 is rotated, the ball on the end of pin 35 is carried around, causing an oscillation of member 19. This motion is frictionally transmitted to disks 15 and 20 and through them to the shaft 8. The valve stem 46 being held in the socket end of this shaft is thus caused to rapidly oscillate through a short angle. Now by pressing inwardly on one of the buttons 42 the end of the corresponding pawl 40 is caused to engage the ratchet teeth 18, thereby preventing the return movement of disk 15 and consequently the shaft which is rigidly keyed thereto. Plate 19, however, is free to oscillate as before, as this plate is only held in frictional contact between disks 15 and 20, and each oscillation of it carries the shaft around a distance equal to the angle of oscillation. Thus when the button is released the plate 19 is in a different position between these two plates and oscillation continues as before. Thus by pressing button 42 at intervals, the angle through which the various parts oscillate may be frequently changed enabling the valve to be accurately ground, and by pressing first one button and then the other the direction of rotation of the shaft may be changed.

While I have shown the preferred embodiment of my invention, it may be understood that minor changes may be made in the details of the design without departing from the spirit thereof.

I claim as new and wish to cover by Letters-Patent:

1. A tool of the character described comprising a casing, a shaft, a ring revolubly mounted on said shaft, a disk keyed to said shaft, said ring and disk being mounted in superposed rotation, means for holding said ring in frictional contact with said disk and means for oscillating said ring.

2. A tool of the character described comprising a casing, a shaft revolubly mounted in said casing, a socket in said shaft, a disk keyed to said shaft, normally disengaged, ratchet means to hold said disk against rotation, a ring loosely mounted on said shaft, said ring and said disk being mounted in superposed relation, means for holding said ring in frictional contact with said disk, and means for oscillating said ring.

3. A tool of the character described comprising a casing, a shaft, a ring oscillatively mounted on said shaft disks keyed to said shaft and held in frictional contact with said ring, said disks and ring being in superposed relation, means for oscillating said ring and ratchet means for holding said shaft against movement in one direction.

4. A tool of the character described comprising a casing, a shaft revolubly mounted in said casing, superposed frictional means mounted on said shaft for oscillating the same, and means for intermittently holding said shaft in one direction against said frictional oscillating means.

5. A tool of the character described comprising a casing, a shaft revolubly mounted in said casing, a socket in said shaft, a disk keyed to said shaft, normally disengaged, ratchet means to hold said disk against rotation, a ring loosely mounted on said shaft, said ring and said disk being mounted in superposed relation, means for holding said ring in frictional contact with said disk, axially disposed guides on the edge of said ring, a rotating crank pin adapted to engage said guides and cause the oscillation of said ring and a radially disposed crank shaft to which said pin is attached.

6. A tool of the character described comprising a casing having a radially disposed handle, a driven shaft axially mounted in said casing, a driving shaft extending through said handle, a ring oscillated by said driving shaft, frictional means for transmitting said oscillations to said driven shaft and normally disengaged ratchet means for holding said last mentioned shaft against movement in either direction.

7. A tool of the character described comprising a casing, a shaft revolubly mounted in said casing, a socket on said shaft, a disk keyed to said shaft, normally disengaged, ratchet means to hold said disk against rotation, a ring about said shaft held in frictional contact with said disk, a handle extending radially from said casing, a driving shaft journaled in said handle, a crank pin on said driving shaft within said casing and axial guides on said ring adapted to contact with said crank pin.

8. A tool of the character described comprising a casing, a radial handle on said casing, a driven shaft journaled axially in said casing, a driving shaft extending longitudinally through said handle, a ring revolubly mounted on said driven shaft, a disk keyed to said driven shaft on each side of said ring, spring means to frictionally hold said ring between said disks, ratchet teeth formed on the periphery of one of said disks, oppositely disposed pawls adapted to be placed in contact with said teeth to prevent rotation in either direction, axially disposed guides on the side of said ring, a crank pin on said driving shaft and a spherical end on said crank pin adapted to coact with said guides.

In testimony whereof I affix my signature.

HERMAN F. GELLERMAN.